(12) United States Patent
Kaasila et al.

(10) Patent No.: US 9,015,654 B2
(45) Date of Patent: Apr. 21, 2015

(54) SYSTEM FOR PROVIDING TEST ENVIRONMENTS FOR EXECUTING AND ANALYSING TEST ROUTINES

(75) Inventors: Jouko Kaasila, Oulu (FI); Petri Pohjanen, Oulu (FI); Henri Kivela, Oulu (FI); Sakari Rautiainen, Helsinki (FI)

(73) Assignee: Bitbar Technologies Oy, Helsinki (FI)

( * ) Notice: Subject to any disclaimer, the term of this patent is extended or adjusted under 35 U.S.C. 154(b) by 163 days.

(21) Appl. No.: 13/584,335

(22) Filed: Aug. 13, 2012

(65) Prior Publication Data
US 2014/0047417 A1    Feb. 13, 2014

(51) Int. Cl.
*G06F 11/30* (2006.01)
*G06F 17/50* (2006.01)
*G06F 9/44* (2006.01)
*G06F 11/36* (2006.01)

(52) U.S. Cl.
CPC .................................. *G06F 11/3664* (2013.01)

(58) Field of Classification Search
CPC ............ G06F 11/3664; G06F 11/3688; G06F 11/3684; G06F 11/3695; G06F 11/3636
See application file for complete search history.

(56) References Cited

U.S. PATENT DOCUMENTS

| | | | |
|---|---|---|---|
| 8,239,840 B1 * | 8/2012 | Czymontek .................... 717/135 |
| 2002/0078380 A1 * | 6/2002 | Lin et al. ........................ 713/201 |
| 2006/0282247 A1 * | 12/2006 | Brennan et al. ................. 703/13 |
| 2008/0126862 A1 * | 5/2008 | Pyska et al. ...................... 714/28 |
| 2009/0254912 A1 * | 10/2009 | Roundtree et al. ............. 718/102 |
| 2010/0023929 A1 * | 1/2010 | Jones et al. .................... 717/124 |
| 2011/0302571 A1 * | 12/2011 | O'Farrell et al. .............. 717/170 |
| 2012/0253745 A1 * | 10/2012 | Dhanapal et al. .............. 702/186 |
| 2013/0179858 A1 * | 7/2013 | Mecke et al. .................. 717/106 |

* cited by examiner

*Primary Examiner* — Don Wong
*Assistant Examiner* — Mohammad Kabir
(74) *Attorney, Agent, or Firm* — Ziegler IP Law Group, LLC

(57) ABSTRACT

A system is operable to provide one or more test environments for executing and analyzing test routine. The system includes one or more user interfaces coupled via a communication network to a server arrangement for hosting a plurality of emulations of wireless communication devices or terminals. The server arrangement is operable to receive one or more software applications for execution upon the wireless communication devices or terminals, and one or more test routines for use in testing the wireless communication devices or terminals. Moreover, the server arrangement is operable to execute one or more the software applications and apply the one or more test routines thereto. Furthermore, the server arrangement is operable to monitor operation of the wireless communication devices or terminals and to provide corresponding test results to the one or more user interfaces.

13 Claims, 3 Drawing Sheets

SYSTEM FOR PROVIDING TEST ENVIRONMENTS FOR EXECUTING AND ANALYSING TEST ROUTINES

FIELD OF INVENTION

The present invention relates to systems for providing test environments for executing and analysing test routines, for example for executing and analysing test routines for execution upon computing hardware of mobile devices and/or terminals. Moreover, the present invention comprises methods of providing test environments for executing test routines, for example for executing and analysing test routines for execution upon computing hardware of mobile devices and/or terminals. Furthermore, the present invention relates to software products recorded on machine-readable data storage media, wherein the software products are executable upon computing hardware, for example in a cloud computing environment, for implementing aforementioned methods.

BACKGROUND

As There are contemporarily a multitude of manufacturers of mobile wireless communication devices, for example mobile telephones, also known as "cell phones" in certain parts of the World. Each manufacturer potentially manufactures several different models or types of mobile devices and/or terminals. The mobile devices and terminals are often provided to users in several different versions, wherein hardware and/or software can vary between versions. For example, variations between versions concerns one or more of:

(i) different screen resolution;
 (ii) different colour depths;
 (iii) different sets of wireless interfaces, for example 3G and/or 4G and/or Bluetooth and/or Near Field Communication (NFC);
 (iv) different types of keyboards;
 (v) different languages;
 (vi) different configurations of sensors, for example different sensitivities and/or accuracies for the sensors, for example different in-built camera resolutions;
 (vii) different computer processing units (CPU's); and
 (viii) different software operating systems.

It will be appreciated from the foregoing that there are potentially a huge number of permutations of mobile devices and/or terminals. Moreover, it is contemporarily desirable by the end-users to be able to download to the mobile device(s) one or more software applications, for example "apps" and "plug-ins", which are compatible with a wide range of mobile devices and/or terminals without encountering compatibility issues.

The huge number of permutations of mobile devices creates practical difficulties for software product developers who are desirous to ensure that their software is correctly executable on a large spectrum of mobile devices and/or terminals. It is impractical for the software developers to purchase examples of each different type of mobile device on which their software products are to be run, for example purchase of hundreds of different mobile devices which is prohibitively expensive.

It is known that there is a possibility to utilize software simulators for testing software. However, it would be even more laborious and costly for a given software product developer both to procure a myriad of mobile devices, and then to develop software simulations of the mobile devices after having characterized their operation. In view of the aforesaid difficulties, a situation arises that software products for mobile devices and/or terminals often face incompatibility issues, namely to the frustration of users, or are uncomfortably expensive when provided in versions which have been tested and verified to execute correctly on a broad spectrum of mobile devices and/or terminals.

SUMMARY

The various embodiments of the present invention seeks to provide a system which provides a test environment in which software products can be tested for compatibility and performance issues.

Moreover, the various embodiments of the present invention also seeks to provide a method of providing a test environment in which software products can be tested for compatibility and performance issues.

According to a first aspect, there is provided a system as defined in appended claim 1: there is provided a system for providing one or more test environments for executing and analysing test routines, wherein the system includes one or more user interfaces coupled via a communication network to a server arrangement for hosting a plurality of emulations of wireless communication devices or terminals, wherein:

(a) the server arrangement is operable to receive one or more software applications for execution upon the wireless communication devices or terminals, and one or more test routines for use in testing the wireless communication devices or terminals;
 (b) the server arrangement is operable to execute the one or more software applications and apply the one or more test routines thereto; and
 (c) the server arrangement is operable to monitor operation of the wireless communication devices or terminals and to provide corresponding test results to the one or more user interfaces.

The embodiment is of advantage in that the plurality of emulated devices or terminals is available to many software developers and provides the developers with a test platform in which compatibility issues arising between different models of devices or terminals, and also between different versions of a model of devices or terminals, can be tested rapidly and conveniently.

Optionally, in the system, the plurality of emulations and/or simulators of wireless communication devices or terminals includes at least one real physical device or terminal which is connected in communication with the server arrangement. In other words, the system provides for testing on simulated/emulated devices and terminals, as well as verification on real physical devices and terminals coupled to the system for the software developers to investigate.

Optionally, in the system, the server arrangement is operable to load the software applications from one or more software application stores in response to instructions input at the one or more user interfaces.

Optionally, in the system, the server arrangement is operable to implement the one or more test routines on the plurality of emulations of wireless communication devices or terminals as a concurrent batch execution operation.

Optionally, in the system, the plurality of emulations of wireless communication devices or terminals includes simulation of at least one of: data memory capacity, screen size, screen format, one or more sensors of the devices or terminals, temperature, movement of the devices or terminals.

Optionally, the system is operable to monitor operation of the wireless communication devices or terminals and to provide corresponding test results to the one or more user interfaces by way of analysis for determining at least one of: differences in screenshot detail presented on the wireless communication devices or terminals, software application execution speed on the wireless communication devices or terminals, operating system compatibility for the wireless communication devices or terminals.

Optionally, the system is operable to modify automatically one or more software applications for the wireless communication devices or terminals in response to earlier test results recorded by the system for execution of the one or more software applications on computing hardware of the wireless communication devices or terminals.

According to a second aspect, there is provided a method of using a system for providing one or more test environments for executing and analysing test routines, wherein the system includes one or more user interfaces coupled via a communication network to a server arrangement for hosting a plurality of emulations of wireless communication devices or terminals, wherein the method includes:

(a) using the server arrangement to receive one or more software applications for execution upon the wireless communication devices or terminals, and one or more test routines for use in testing the wireless communication devices or terminals;

(b) executing in the server arrangement one or more the software applications and applying the one or more test routines thereto; and (c) using the server arrangement to monitor operation of the wireless communication devices or terminals for providing corresponding test results to the one or more user interfaces.

Optionally, the method includes for the plurality of emulations of wireless communication devices or terminals to include at least one real physical device or terminal which is connected in communication with the server arrangement.

Optionally, the method includes using the server arrangement to load the software applications from one or more software application stores in response to instructions input at the one or more user interfaces.

Optionally, the method includes using the server arrangement to implement the one or more test routines on the plurality of emulations of wireless communication devices or terminals as a concurrent batch execution operation.

Optionally, when implementing the method, the plurality of emulations of wireless communication devices or terminals includes simulation of at least one of: data memory capacity, screen size, screen format, one or more sensors of the devices or terminals, temperature, movement of the devices or terminals.

Optionally, the method includes using the system to monitor operation of the wireless communication devices or terminals and to provide corresponding test results to the one or more user interfaces by way of analysis for determining at least one of: differences in screenshot detail presented on the wireless communication devices or terminals, software application execution speed on the wireless communication devices or terminals, operating system compatibility for the wireless communication devices or terminals.

Optionally, the method includes using the system to modify automatically one or more software applications for the wireless communication devices or terminals in response to earlier test results recorded by the system for execution of the one or more software applications on computing hardware of the wireless communication devices or terminals.

According to a third aspect, there is provided a software product recorded on machine-readable data storage media, wherein the software product is executable upon computing hardware for implementing a method pursuant to the second aspect of the invention.

It will be appreciated that features of the invention are susceptible to being combined in various combinations without departing from the scope of the invention as defined by the appended claims.

DESCRIPTION OF THE DRAWINGS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

Figure 1:
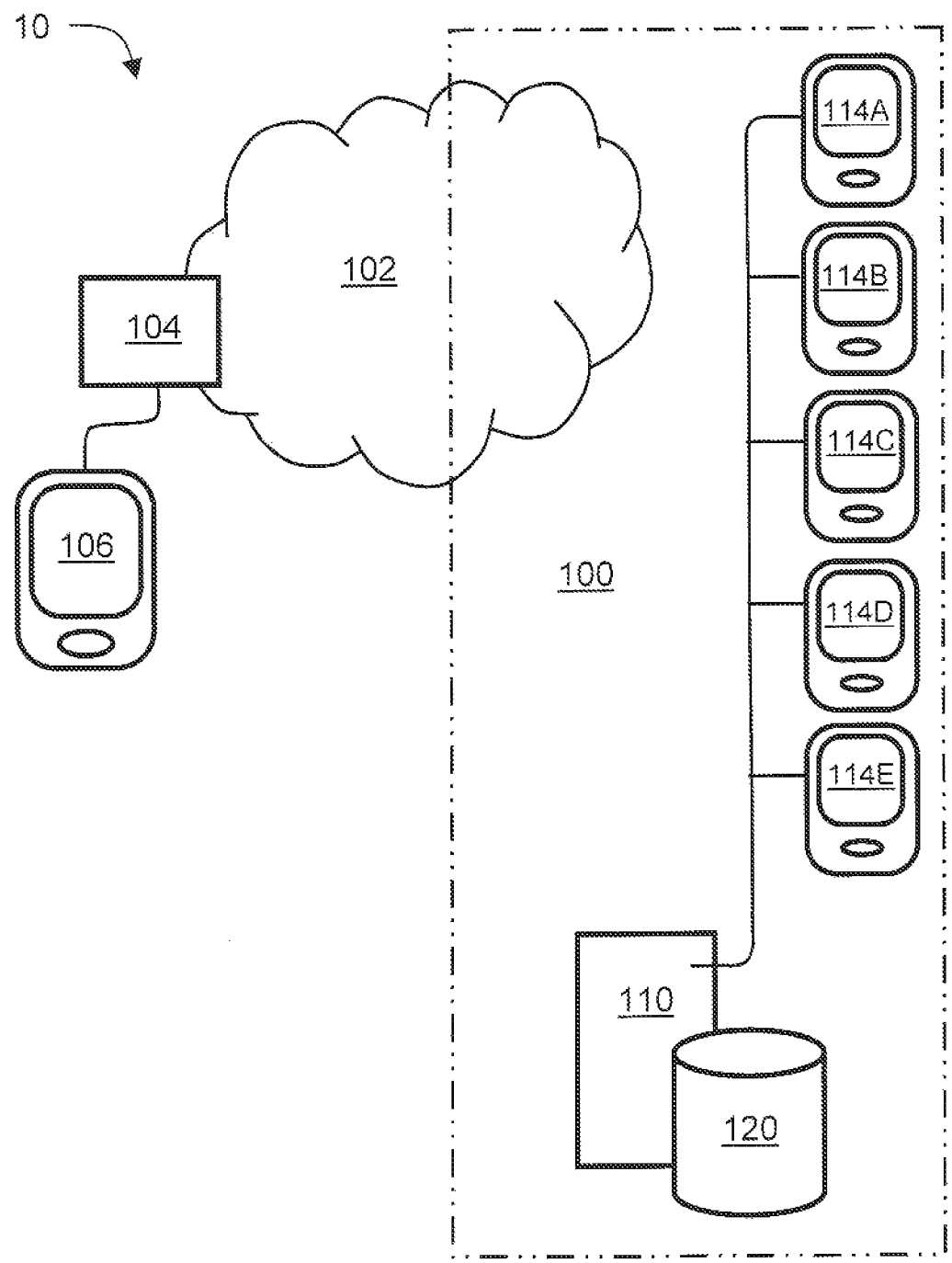
FIG. 1 is an illustration of a system for providing one or more target environments for executing and analysing test routines.

Referring to FIG. 1, there is shown an illustration of a system for providing target environments for executing and analysing test routines; the system is indicated generally by 10. Moreover, the system 10 includes a test environment 100, wherein the test environment 100 is beneficially implemented by way of a cloud computing service, for example hosted in the Internet, which can be accessed by software developers via user interfaces. Each software developer employs a software development environment provided in a user interface, for example hosted in a laptop computer or workstation 104; optionally, the software development environment is hosted by way of cloud computing services and accessed via a laptop computer or workstation. Optionally, each software developer has at least one mobile wireless communication device 106, which is connectable via wireless communication links to the aforesaid software development environment.

Beneficially, the test environment 100 includes a server arrangement 110. The server arrangement 110 is configurable to control one or more physical or simulated mobile wireless communication devices 114A to 114E pursuant to the instruction from one or more of the software developers. Optionally, the server arrangement 110 includes a database server 112 for storing test patterns and test results. Beneficially, physical mobile wireless communication devices are connectable to the server system 110 wirelessly or with coupling leads, for example via one or more Universal Serial Buses (USB).

A method of utilizing the system 10 will now be described with reference to FIG. 2. In a first step 200A, a software developer composes a test routine by way of the laptop computer or workstation 104. Alternatively, in a first step 200B, the software developer sends their developed software (binary and/or source code) to the server arrangement 110, or merely defines a name of the developed software, or any other unique identifier, and the laptop computer or workstation 104 fetches the developed software from various sources or binaries from one or more of:
(i) any software application stored in the Internet or similar data communication network;
(ii) any source code storage device; and
(iii) any device connected to the Internet or similar data communication network.

In a second step 210, the software developer is able to execute the test routine locally upon computing hardware included in his/her own mobile wireless communication device 106.

In a third step 220A, the software developer sends both the software to be tested as well as the test routine to the test environment 100. Optionally, the software is binary code, byte code, source code and so forth depending upon operation of the system 10. Moreover, the test routine is optionally a set of instructions for controlling operation of the test environment 100. Alternatively, in a third step 220B, the test environment 100 automatically generates one or more test routines for the software uploaded in step 200B. Optionally, these one or more test routines include routines pertaining to one or more of:
(i) software security;
(ii) software performance;
(iii) software usability;
(iv) software interoperability;
(v) software stress testing;
(vi) testing software interactions between large numbers of users and devices, or automatically alternating and optimizing the binary, byte or source code of the software to created desired test routines.

In a fourth step 230, the software is uploaded to one or more of the wireless communication device simulations 114A to 114E in the test environment 100, or to any device or emulated or simulated software available on the communication network, for example the Internet or emulated/simulated environment running in server arrangement 110. The one or more test routines are thereby capable of being applied to the developed software which is executed by way of simulation on the wireless communication device simulations 114A to 114E in the test environment 100.

In a fifth step 240, execution of the one or more test routines is controlled by the server arrangement 110, wherein the simulation is optionally timed, random or follows a pattern defined on the service arrangement 110. The server arrangement 110 is thus capable of controlling any of the wireless communication device simulations 114A to 114E as well as emulated/simulated environments.

In a sixth step 250, the results of applying the developed software and the one or more test routines are stored on the database server 120, and thereafter processed to expose common patterns therein and more detailed data pertaining to the tested software, devices, users, networks and so forth. In other words, the results are analyzed to provide the software developer with valuable insight regarding performance and compatibility aspects of their developed software on the wireless communication device simulations 114A to 114E in the test environment 100.

In a seventh step 260, the software developer is able to access the test results and therefrom analyses the software and optionally download optimized versions of the source, byte or binary codes of their software. Optionally, at least a portion of the test results acts as a trigger and/or parameters for further automated steps, for example publishing the tested software on the Internet, on application stores or publishing the tested software directly on any wireless communication devices, for example mobile telephones.

In an eighth step 270, the software developer can execute all or parts of the test routines as many times as he/she desires. Alternatively, the software developer can change parts of the test routines and then re-execute the test routines, for example for iterative developed software testing and/or for implementing developed software adjustments. Optionally, execution of test routines is automated by employing any trigger or criteria that influence in a manner of an automated parameter of the system 10. Such triggers and parameters optionally include, but are not limited to, one or more of:
(i) an amendment to an application source code;
(ii) a change of hardware/software configuration or any of the connected terminals or any of the connected terminals or emulators/simulators; and
(iii) time-based triggers or triggers originating from any other systems connected to the system 10, for example Internet services, software applications stores, source code control systems, malware scanners, mobile wireless communication devices.

Figure 2:
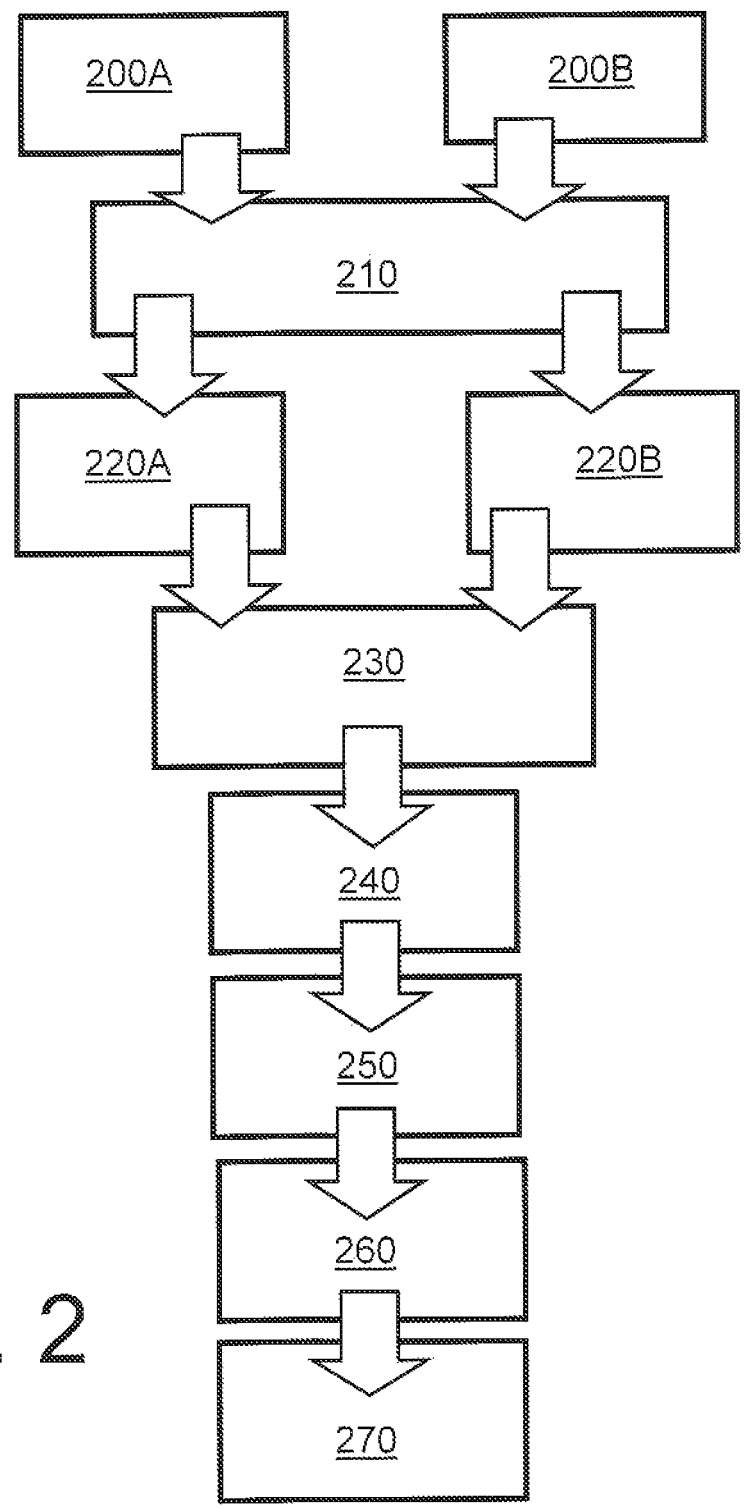
FIG. 2 is an illustration of steps of a method executable in the system of FIG. 1 for applying test routines to software for mobile wireless devices and terminals.

In addition to implementing the method as outlined with reference to FIG. 2, the method can alternatively, or additionally, be employed to cause the server arrangement 110 to be configured to run simulated/emulated environments for testing purposes. For example, the aforesaid test routines can be executed automatically, manually or a combination thereof within the test environment 100.

Optionally, the test routines can be configured to provide user feedback to the software developer regarding functionality of developed software, for example to investigate a manner in which screen size and resolution differences between mobile wireless devices, for example mobile telephones, influence software functionality and usability, to analyze software performance and execution speed of the software, to simulate arbitrary numbers of simulated or real users, and so forth. The test routines can be executed concurrently in many wireless terminals or simulated or emulated environments; optionally, inputs may be provided from real users or real physical environments, for example depending upon spatial location, temperature, acceleration, movements, pressure, cadence, altitude, visual information and audio information. When executing the aforementioned test routines, mutually different terminals, mutually different previous test executions, mutually different simulated or emulated environments, mutually different records or real user interactions, mutually different simulations of user interactions and processed comparative data values can be beneficially employed for developed software benchmarking purposes.

Optionally, the aforesaid test routines include hardware and mobile wireless terminal sensor-related tests. For example, accelerometers included within the wireless devices or terminals can be tested either in a simulated mode or by physical tests, for example via test bench whereat the simulated mobile wireless devices 114A to 114E can be coupled to sensors which can be tilted, shaken or turned automatically. Optionally, such mobile wireless terminals can be carried by human users or other living entities, for example canine animals, as a part of executing the test routines. Optionally, there are included in the system 10 several sets of test terminals which can be operated concurrently and arranged to execute mutually different test routines for the same developed software to be tested, thereby enabling more rapid testing of the developed software.

Figure 3:
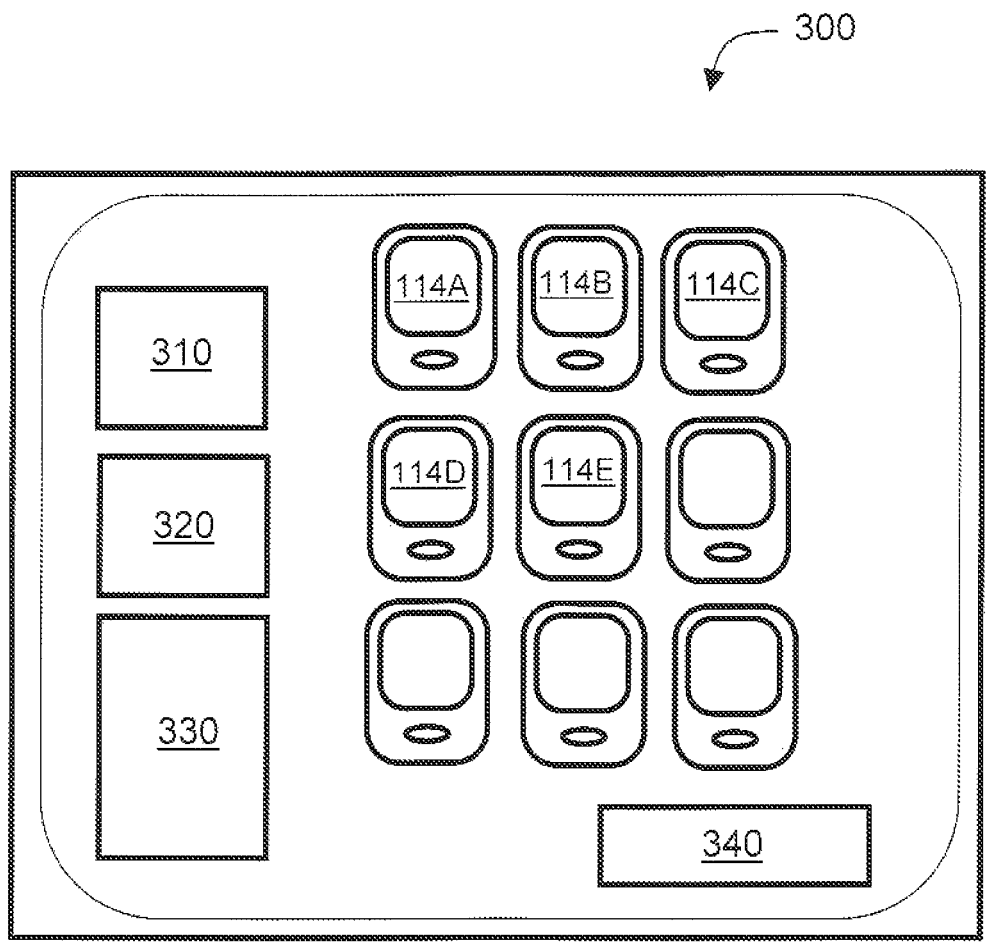
FIG. 3 is an illustration of a layout of a user interface for use in the system of FIG. 1.

Beneficially, software developers are provided with web-based interfaces to the server arrangement 110 for enabling the developers to view results after executing of the test routines or in real-time whilst the test routines are being executed. Referring to FIG. 3, a user interface 200 is beneficially shown in the system 10 via a browser window. The software developers can select from a plurality of mutually different mobile wireless devices, for example mobile telephones, 202 to define those which the software developers are desirous to test using one or more appropriate test routines. In an example situation, a software developer has tested his/her developed software on all available models of mobile wireless devices 114A to 114E, namely the mobile telephones 202, and wants to study and analyze associated test results. Selected models of mobile telephones 202 as illustrated in the user interface 200 are to be investigated by the software developer in greater detail, for example for software debugging purposes for these selected models 202. The software developer is able to modify or develop, via the user interface, specific test routines for the selected mobile telephones 202.

When employing the system 10, software developers are also able to access a service of an Application Programming Interface (API) through which all interactions providing input to the test environment 100 and handling output from the test environment 100 can be automated through use of suitable software. Such inputs include, but are not limited to:
(i) software to be tested;
(ii) any test parameters; and
(iii) any usage scenarios and inputs for creating random, semi-random, or model-based test inputs.

Outputs include, but are not limited to:
(i) test results in machine-processable format;
(ii) modified source-, byte- or binary-code;
(iii) triggers to other systems, for example Internet services, application stores, source code control systems, malware scanners, mobile wireless devices; and
(iv) e-mail, SMS and any other machine or human-processable format.

The system 10 can optionally be configured to record screen-shots, video, audio, temperature, movements, power usage, communication network usage, radio frequency emissions and magnetic induction arising from terminals to be tested using the system 10, namely for analyzing performance of developed software and to analyze that all target terminals are rendering, receiving and processing information in a manner as intended by the software developer.

Capturing user interactions for automated test execution will now be described. Beneficially, a specific software application is used to capture all user actions, as well as software and hardware internal states; such internal states include one or more of processes, memory details, processor load, communication network traffic, communication network latency, communication network load, mobile wireless device usage logs system logs, as well as data pertaining to external environmental variables, for example temperature, radio signal magnitude, spatial location, acceleration, direction of movement, air pressure, ambient illumination, ambient sounds, ambient electromagnetic fields. Such data can be further processed to generate a test script which can be subsequently employed to reproduce exactly similar usage patterns and user environments on physical and simulated/emulated devices controlled by the server arrangement 110. Such capture is optionally delayed (namely, a capture step, followed by a store-all-information step, followed by generate-script step, followed by a execute-script-in-all-devices step) or it may be real-time (namely one user employs a real or simulated/emulated device to direct other real or simulated/emulated devices in real-time). Moreover, the system 10 is also capable of recording interactions between several users and several mobile communication devices for later regeneration of associated interaction patterns.

Results of analysis provide by the system 10 will next be described. A software developer can inform the system 10 concerning which target terminal 106 he/she is desirous to use for purposes of giving "approved" references to the system 10. Such "approved" references are also optionally generated by the test environment 100. For example, the software developer selects one or more terminals as reference terminals; the system 10 can be configured to change all or part of target software automatically based on tests arising from execution of one or more of aforementioned test routines, for ensuring that the developed software functions in a fluent manner as intended in all target terminals, namely the system 10 is susceptible to being integrated to a software development environment to create desired versions of the software, for example software providing different image widths to suit specific models of mobile telephones.

Test scripts employed for testing target software in conjunction with wireless communication devices can be used as initial values for a next test run amendments to be implemented to the target developed software. Optionally, the system 10 can also generate test scripts based upon any simulated, recorded, and model-based usage scenarios, or from real-time or delayed inputs from real users as well as inputs for creating random, semi-random or model-based scripts originating from other computer systems. These other systems optionally include, but are not limited to, Internet services, software application stores, source code control systems, malware scanners, and mobile wireless devices. Moreover, these text scripts can also be dynamically changed during test execution based on any of the internal or external inputs created during test routine execution.

The system 10 is capable of hosting different test routine executions. Different variations of test routine runs can be optionally configured to be executed on computing hardware of certain vendor mobile terminals, for example a given procedure can be configured to be executed with different versions of a nominally same operating system, for example Android v2.01, v2.2, v2.4 or similar, to investigate forward and backward compatibility of developed software. Moreover, for example, an impact of screen resolution in respect of software execution speed is susceptible to being analyzed using the system 10. In general, any variable pertaining to mobile telephones and mobile terminal versions can be used for testing in the system 10; for example, the system 10 can be used to configure and test mobile telephones equipped with memory capacities of 4 Gbytes, 8 Gbytes, 16 Gbytes and so forth of internal data memory to determined an effect of memory size on performance when the terminals execute given developed software. Moreover, physical capabilities of the terminals is also susceptible to being tested in the system 10, for example target terminals can be subjected to different radio environments when being simulated in the test environment 100, for example some target terminals exhibiting good reception with relatively high data rate communication characteristics and other target terminals exhibiting bad reception and relatively low data bandwidth.

Furthermore, other physical parameters of target terminals can be tested in the test environment 100, for example "look and feel" of user interfaces in different illumination conditions. Yet additionally, target devices for testing in the test environment 100 can be configured before testing, for example to reduce their amount of available data storage memory to investigate whether or not any adverse effects on target device performance is likely to arise in practice, namely by way of simulation. Beneficially, the target devices can be configured to execute on their computing hardware a plurality of software applications concurrently to test within the test environment 100 whether or not there are any conflict problems between computing resources consumed by the plurality of software applications. Optionally, the test environment 100 can be configured to send messages to the target terminals and also receive messages therefrom, for example short messaging service (SMS) communications, multimedia messaging service (MMS) communications, push notifications, push messages, voice calls, video calls, for example messages having open Internet Protocol (IP) connections concurrently as the test routines are executed in the test environment 100. Moreover, during such sending of aforesaid messages, influences from physical characteristics can also be simulated, for example influences of one or more of: temperature, vibration, ambient illumination, acoustic environment, electromagnetic environment.

Test results from executing one or more test routines in the test environment in respect of one or more target terminals can be saved in the database server 112, in the mobile devices 114A to 114E being simulated or any device connected to the Internet, for example concurrently simulated in the test environment 100. The test results can be viewed by the software developer or can be provided as raw data to other parties as required. The system 10 can include an automatic arrangement for proposing improvements based upon collated data from the test environment 10; optionally, the developed software is automatically changed based upon generated test results from the test environment 100. Beneficially, the system 10 is operable to create visualizations regarding performance of developed software for various mobile wireless devices, software versions and wireless communication networks. Moreover, the system 10 can also be used to visualize for the software developer a manner in which different use cases, navigation paths and usage load scenarios are handled by the developed software under test conditions.

Beneficially, the test system 10 can be configured to search and fetch at least some of its executable software files from defined network addresses, for example all its executable software files therefrom, or from anywhere from where such executable software files may be stored. After fetching these executable software files, the server arrangement 110 can automatically create test scripts for each executable software file, and thereafter execute each executable software file and associated generated test script on all physical and/or simulated/emulated mobile wireless devices whereat execution is possible, thereby providing detailed test results indicative of a manner in which these executable software files behave in each unique hardware/software configuration of the mobile wireless devices. Such an automated manner of operation of the system 10 is beneficially typically employed as a form of batch process, for instance when systematically testing all software applications recorded in a software application store for ensuring compatibility with a defined range mobile wireless devices, for example mobile telephones or mobile terminals.

The server arrangement 110 is beneficially configurable to make screen captures of each target device or terminal being tested in the test environment 100. Optionally, the screen capture is achieved via software which accesses internal memory of each target device or terminal, whether physical or simulated/emulated. Optionally, one or more cameras on top of the mobile devices 114A to 114E, when implemented in a physical manner, are employed to record screen activities. Beneficially, the system 10 employs other sensors for recording sound, temperature, movements, electromagnetic induction and so forth.

Optionally, pattern recognition is employed to analyze video content, for example using cameras or screen capture, presented on screens of the mobile devices 114A to 114E, for example for ensuring that all devices or terminals are showing similar content simultaneously. Video analysis of the presented content can be utilized to determine whether or not a given device or terminal is faster or slower than others when presenting video content. Moreover, recorded test results can be compared in the system 10 for each iteration of developed software to determine, for example, improvements in performance for the different versions of the development software.

Optionally, the system 10 can be configured to take one or more screenshots of output from developed software execution for different stages of test execution. Such screenshot views enable software developers to compare side-by-side real pixel-to-pixel screenshots from all devices connected to the system 10 or simulated/emulated by the system 10. Such comparison of screenshots provides significant time saving for software developers when developing software; different screen sizes, resolutions and form factors can be checked, namely parameters which make visual validation of screen layout in each device or terminal essential for software developers. Beneficially, the system 10 provides a screenshot baseline feature which software developers can utilize to define a temporal baseline for every screenshot for every device and/or terminal hosted by the system 10; every time tests are executed in the test environment 100, new screenshots are compared to the software developers' baseline screenshots, and differences there between notified to the software developers via the system 10. Beneficially, the screenshot baseline feature even highlights differing areas of the screenshot to help the software developers identify and appreciate how screenshots mutually vary.

As illustrated in FIG. 3, the system 10 provides a user interface 300, beneficially provided via a web interface, for example an Internet web interface such as a browser window. The user interface 300 provides one or more fields 310 for presenting test results, one or more fields 320 for defining software applications, one or more fields 330 for defining test scripts, and one or more fields 340 for defining models of devices and/or terminals to be investigated.

Terminal can refer, but is not limited to, for example to mobile terminal, mobile device, mobile phone, laptop, web pad, smart phone, accessories for mobile devices or a device with embedded software (such as house hold appliance, car, robot, vehicle, multimedia device, television, medical device etc) i.e. to anything which has software in it. Emulation/simulation can also include emulation/simulation of any device i.e. not limited to mobile devices.

Server system 110 and database 120 can be arranged as centralized computer system or those can be distributed as cloud service. Servers and databases can be physically in same or distributed locations (including hosting by any user connected to Internet). Physical terminals can be in same physical place or those can be distributed enabling for example crowd sourcing of terminals.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

What is claimed:

1. A server system for providing one or more test environments for executing and analyzing test routines, wherein the server system is coupled via a communication network to one or more user interfaces, and the server system is arranged to be communicatively coupled with a plurality of physical wireless communication devices, the server system comprising:
a processor and a memory comprising software, the processor and memory with the software configured to cause the server system to:
 receive one or more software applications for execution upon the physical wireless communication devices, and receive one or more test routines for use in testing the physical wireless communication devices;
 control execution of the one or more software applications in the physical wireless communication devices and control application of the one or more test routines thereto;
 monitor operation of the physical wireless communication devices and to provide corresponding test results to the one or more user interfaces; and
 use the one or more test routines to determine at least one of: software application execution speed on the physical wireless communication devices; and operating system compatibility for the physical wireless communication devices.

2. A server system as claimed in claim 1, wherein the server system is operable to load the software applications from one or more software application stores in response to instructions input at the one or more user interfaces.

3. A server system as claimed in claim 1, wherein the server system is operable to implement the one or more test routines on the plurality of physical wireless communication devices as a concurrent batch execution operation.

4. A server system as claimed in claim 1, wherein the one or more test routines include testing of at least one of: data memory capacity, screen size, screen format, one or more sensors of the physical wireless communication devices, temperature, movement of the physical wireless communication devices.

5. A server system as claimed in claim 1, wherein the server system is operable to monitor operation of the physical wireless communication devices and to provide corresponding test results to the one or more user interfaces by way of analysis for determining differences in screenshot detail presented on the physical wireless communication devices.

6. A server system as claimed in claim 1, wherein the system is operable to modify automatically one or more software applications for the physical wireless communication devices in response to earlier test results recorded by the server system for execution of the one or more software applications on the physical wireless communication devices.

7. A method of using a server system for providing one or more test environments for executing and analyzing test routines, wherein the server system comprises a processor and a memory, and is coupled via one or more user interfaces, and the server system is arranged to be communicatively coupled with a plurality of physical wireless communication devices, wherein said method includes:
 receiving one or more software applications for execution upon the physical wireless communication devices, and one or more test routines for use in testing the physical wireless communication devices;
 executing one or more the software applications and applying the one or more test routines thereto;
 monitoring operation of the physical wireless communication devices for providing corresponding test results to the one or more user interfaces; and
 using the one or more test routines to determine at least one of: software application execution speed on the physical wireless communication devices; and operating system compatibility for the physical wireless communication devices.

8. A method as claimed in claim 7, wherein the method includes using the server system to load the software applications from one or more software application stores in response to instructions input at the one or more user interfaces.

9. A method as claimed in claim 7, wherein the method includes using the server system to implement the one or more test routines on the plurality of physical wireless communication devices as a concurrent batch execution operation.

10. A method as claimed in claim 7, wherein the one or more test routines includes testing of at least one of: data memory capacity, screen size, screen format, one or more sensors of the physical wireless communications devices, temperature, movement of the physical wireless communications devices.

11. A method as claimed in claim 7, wherein the method includes using the server system to monitor operation of the physical wireless communication devices and to provide corresponding test results to the one or more user interfaces by way of analysis for determining differences in screenshot detail presented on the physical wireless communication devices.

12. A method as claimed in claim 7, wherein the method includes using the server system to modify automatically one or more software applications for the physical wireless communication devices in response to earlier test results recorded by the server system for execution of the one or more software applications the physical wireless communication devices.

13. The method of claim 7 implemented as a software product recorded on non-transitory machine-readable data storage media wherein the software product is executable upon computing hardware.

* * * * *